(12) United States Patent
Tanikawa et al.

(10) Patent No.: US 7,261,844 B2
(45) Date of Patent: Aug. 28, 2007

(54) PHOTOCHROMIC CONTACT LENS HAVING EXCELLENT DISCOLORING CHARACTERISTIC

(75) Inventors: Sadayasu Tanikawa, Kasugai (JP); Naotaka Kamiya, Kasugai (JP); Shigeyasu Nagai, Kasugai (JP)

(73) Assignee: Menicon Co., Ltd., Nagoya-Shi (JP)

( * ) Notice: Subject to any disclaimer, the term of this patent is extended or adjusted under 35 U.S.C. 154(b) by 0 days.

(21) Appl. No.: 11/175,888

(22) Filed: Jul. 6, 2005

(65) Prior Publication Data

US 2005/0243273 A1 Nov. 3, 2005

Related U.S. Application Data

(63) Continuation of application No. PCT/JP2004/000052, filed on Jan. 7, 2004.

(30) Foreign Application Priority Data

Jan. 27, 2003 (JP) ............................. 2003-017281

(51) Int. Cl.
*G02B 5/23* (2006.01)
*G02B 1/04* (2006.01)
*G02C 7/04* (2006.01)
*C07D 265/12* (2006.01)

(52) U.S. Cl. .................. 252/586; 252/582; 351/160 R; 351/162; 523/106; 523/107; 544/71

(58) Field of Classification Search ................. 252/586
See application file for complete search history.

(56) References Cited

U.S. PATENT DOCUMENTS

| 4,737,556 | A | * | 4/1988 | Itoh et al. .................... 526/245 |
| 4,904,421 | A | * | 2/1990 | Ando et al. ................... 264/2.6 |
| 5,008,354 | A | * | 4/1991 | Sawamoto et al. ......... 526/246 |
| 5,763,511 | A | | 6/1998 | Chan et al. |
| 6,017,121 | A | * | 1/2000 | Chateau et al. ............. 351/161 |
| 6,224,945 | B1 | * | 5/2001 | Calderara ................... 427/353 |
| 6,367,930 | B1 | * | 4/2002 | Santelices et al. .......... 351/177 |
| 2002/0091174 | A1 | * | 7/2002 | Soane et al. ................. 523/106 |
| 2002/0107350 | A1 | * | 8/2002 | Widawski et al. ....... 526/318.4 |

FOREIGN PATENT DOCUMENTS

| JP | 04-028725 B2 | 5/1992 |
| JP | 04-208919 A1 | 7/1992 |
| JP | 2723225 B2 | 11/1997 |

* cited by examiner

*Primary Examiner*—Randy Gulakowski
*Assistant Examiner*—Timothy J. Kugel
(74) *Attorney, Agent, or Firm*—Burr & Brown

(57) ABSTRACT

A photochromic contact lens having a period of time for discoloring the contact lens from a colored state to the uncolored state shortened, wherein the photochromic contact lens is made of an oxygen-permeable polymer material having a second-order transition point of not higher than 110° C., and formed to have an oxygen permeation coefficient of not less than 50, and wherein the contact lens contains a dye capable of exhibiting photochromism.

16 Claims, 1 Drawing Sheet

FIG. 1a  FIG. 1b  FIG. 1c
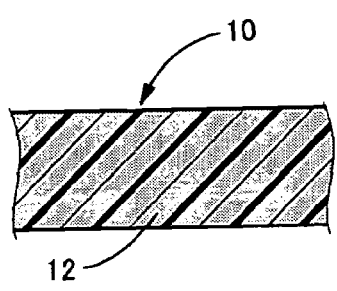 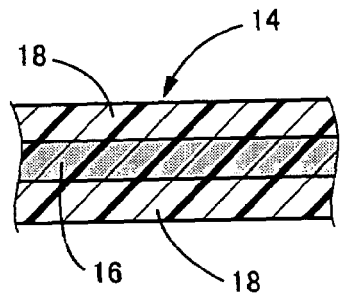 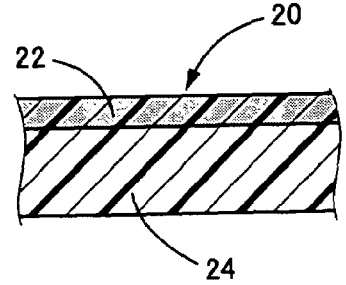
FIG. 2a  FIG. 2b  FIG. 2c
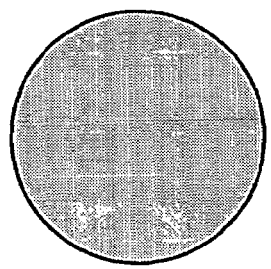 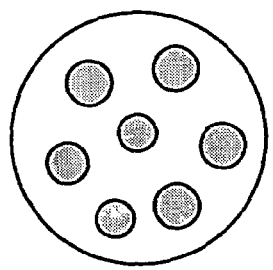 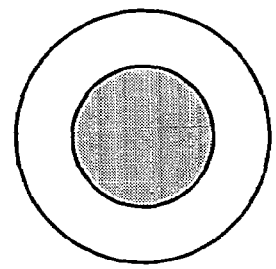

PHOTOCHROMIC CONTACT LENS HAVING EXCELLENT DISCOLORING CHARACTERISTIC

This application is a continuation of the International Application No. PCT/JP2004/000052, filed Jan. 7, 2004, which claims the benefit under 35 U.S.C. § 119(a)-(d) of Japanese Application 2003-017281, filed Jan. 27, 2003, the entireties of which are incorporated herein by reference.

TECHNICAL FIELD

The present invention relates in general to a photochromic contact lens having excellent discoloring characteristic. More particularly, the present invention relates to a technique for effectively reducing a period of time for discoloring a contact lens from a colored state to an uncolored state.

BACKGROUND ART

Conventionally, in order to protect eyes from a strong light (UV-light), there have been proposed various contact lenses, or so-called photochromic contact lenses, having a function of light control (photochromism), in which the contact lenses are colored by a light and discolored by insulation of a light.

For example, JP-A-4-208919 discloses a method of manufacturing a photochromic hard contact lens by using a polymer obtained by polymerizing 30 to 80 parts by weight of methyl methacrylate, 2 to 30 parts by weight of bifunctional acrylate or methacrylate, and 1 to 50 parts by weight of additional acrylate-containing or methacrylate-containing monomer, under an existence of spiro naphthoxazine as a photochromic compound (coloring matter). In addition, JP-B2-4-28725 discloses a method of forming a contact lens from a resin block capable of exhibiting photochromism, in which the resin block is manufactured by polymerizing a mixture of methyl methacrylate or methyl methacrylate containing monomers and spiropyran compound capable of exhibiting photochromism. Further, Japanese Patent No. 2723225 discloses a technique for forming a photochromic contact lens from a polymer, wherein the polymer is obtained by using a photochromic compound of an ionic dissociation type, whose structure and color are changed by a light, which exhibits an ionic dissociation at its colored state, and has a copolymerizable functional group.

These conventionally known photochromic contact lenses are enabled to protect the lens wearer's eyes and exhibit a characteristic of antidazzling effect, by adding a compound (photochromic dye), which has a function of light control (photochromism), to the contact lens, or by introducing an unsaturated photochromic dye to a main chain of a polymer to form the contact lens. However, these background arts simply explain that the contact lenses are colored by an irradiation of the light, and if the light is insulated, the color is discolored immediately or without delay. There hasn't been proposed a method for improving the characteristic of discoloration and reducing the period of time for the discoloration.

If it takes too much time for discoloring the contact lens from a colored state to an uncolored state, this may cause problems. For instance, if the lens wearer is driving a car, visual acuity of objects is poor in a tunnel, which may cause undesirable effects for the driving. However, the discoloration of the conventionally used photochromic contact lens from the colored state to the uncolored state is not completed in a sufficiently short period of time. Therefore, there is desired a photochromic contact lens, which has an excellent discoloring characteristic and takes a short period of time for the discoloration.

DISCLOSURE OF THE INVENTION

The present invention was developed in the light of the background art situations described above. It is therefore an object of the present invention to provide a photochromic contact lens, wherein the time for discoloring the contact lens from a colored state to an uncolored state is remarkably shortened, by accelerating the reaction of the discoloration of the contact lens from the colored state to the uncolored state.

Therefore, the present invention is provided to achieve the above-mentioned technical object. The principle of the present invention is to provide a photochromic contact lens having excellent discoloring characteristic, characterized in that the photochromic contact lens is made of an oxygen-permeable polymeric material having a second-order transition point of not higher than 110° C., and formed to have an oxygen permeation coefficient of not less than 50, and the contact lens contains a dye capable of exhibiting photochromism.

In the photochromic contact lenses according to the present invention, an oxygen-permeable polymeric material, which has an oxygen permeation coefficient of not less than 50 and a second-order transition point of not higher than 110° C., is used as the polymeric material for forming the contact lenses containing a dye capable of exhibiting photochromism. Owing to this configuration, if the contact lenses are subjected to a strong light, the contact lenses are promptly colored, so that the eyes of the contact lens wearer are protected. On the other hand, if the light is weakened, the color of the contact lenses is promptly discolored in an extremely short period of time, so that the contact lens user can keep enjoying an excellent visual acuity.

In one preferred form of the photochromic contact lens according to the present invention, spiropyran compound or spirooxazine compound, which doesn't have a nitro group as a substituent is employed as the dye capable of exhibiting photochromism. By using the dye having the above-mentioed structure, the period of time for discoloring the contact lens from the colored state to the uncolored state can be further shortened.

As examples of the above-mentioned spirooxazine compound, which doesn't have a nitro group as a substituent, there maybe used 1,3-dihydro-1,3,3-trimethylspiro[2H-indole-2,3'-[3H]naphth[2,1-b][1,4]oxazine], for instance.

In another preferred form of the photochromic contact lens according to the present invention, the above-mentioned dye, capable of exhibiting photochromism, is employed in an amount of 0.001 to 5 parts by weight, per 100 parts by weight of the polymeric material. Accordingly, the desired photochromic effect can be advantageously realized.

In still another preferred form of the photochromic contact lens according to the present invention, a polymer obtained by polymerizing a polymerizable composition, whose main component is a silicon-containing monomer and/or a fluorine-containing monomer, is employed as the polymeric material to form the contact lens. Use of this sort of polymer highly contributes to reduce the period of time for the discoloration of the contact lens from the colored state. It is desirable that the ratio of the silicon-containing monomer, which is included in and bonded to the polymer, is 10 to 90% by weight of the polymer. It is also desirable that the ratio of the fluorine-containing monomer, which is included in and bonded to the polymer, is 15 to 95% by weight of the polymer.

As the above-mentioned silicon-containing monomer, it is preferred to employ at least one monomer selected from the group consisting of a silicon-containing (meth)acrylate, a silicon-containing styrene derivative, and a silicon-containing macromonomer. As the above-mentioned fluorine-containing monomer, it is preferred to employ at least one of a fluorine-containing styrene derivative and a fluorine-containing alkyl(meth)acrylate.

In still another preferred form of the photochromic contact lens according to the present invention, there is employed, as the polymeric material to form the photochromic contact lens, a polymer, which is obtained by polymerizing a polymerizable composition comprising: the silicon-containing monomer and/or the fluorine-containing monomer; an additional unsaturated monomer, which contains none of the silicon-containing monomer and the fluorine-containing monomer; and a cross-linking agent which includes at least two polymerizable groups.

In still another preferred form of the present invention, the polymeric material including the dye capable of exhibiting photochromism is advantageously provided by the addition of the above-mentioned dye capable of exhibiting photochromism to the polymerizable composition. Owing to this, the dye is uniformly dispersed in the polymeric material, so that the desired photochromic effect can be advantageously exhibited.

In the photochromic contact lens according to the present invention, it is further preferred that the oxygen permeation coefficient is not less than 70 and the second-order transition point is not higher than 100° C.

BRIEF DESCRIPTION OF THE DRAWING

FIGS. 1a to 1c are enlarged partial elevational views of examples of the photochromic contact lens according to the present invention.

FIGS. 2a to 2c are front views of examples of the photochromic contact lens according to the present invention.

BEST MODE FOR CARRYING OUT THE INVENTION

In the photochromic contact lens according to the present invention, contact lens materials, to which the dye capable of exhibiting photochromism is added, are selected from known polymeric materials having the second-order transition point and the oxygen-permeability as prescribed by the present invention. As the polymeric materials, various known polymers (vinyl polymers), which are obtained by polymerizing at least one monomer having an unsaturated polymerizable double bond, can be used. The monomer is selected from known monomers, as required, to form a polymer, having a second-order transition point of not higher than 110° C., and formed to have an oxygen permeation coefficient of not less than 50. By using the polymer formed of thus selected monomer, desired contact lenses, such as a hard contact lens and a soft contact lens, and a hydrophilic contact lens are formed.

In the present invention, as the unsaturated monomer, which is used to form the polymer having the second-order transition point and the oxygen permeation coefficient as described above, a silicon-containing (Si-containing) monomer and/or a fluorine-containing (F-containing) monomer is suitably used. The silicon-containing monomer and/or the fluorine-containing monomer may be selected from conventionally used monomers, which provides polymers for contact lenses. For example, there may be suitably selected monomer from among a silicon-containing (meth)acrylate, a silicon-containing styrene derivative, a fluorine-containing styrene derivative, a fluorine-containing alkyl (meth)acrylate, and a silicon-containing macromonomer.

Examples of the silicon-containing (meth)acrylate include pentamethyldisiloxanylmethyl(meth)acrylate, pentamethyldisiloxanylpropyl(meth)acrylate, methyl-bis(trimethylsiloxy)silylpropyl(meth)acrylate, tris(trimethylsiloxy)silylpropyl(meth)acrylate, mono[methyl-bis(trimethylsiloxy)siloxy]bis(trimethylsiloxy)silylpropyl(meth)acrylate, tris[methyl-bis(trimethylsiloxy)siloxy]silylpropyl(meth)acrylate, methyl-bis(trimethylsiloxy)silylpropylglycerol(meth)acrylate, tris(trimethylsiloxy)silylpropylglycerol(meth)acrylate, mono[methyl-bis(trimethylsiloxy)siloxy]bis(trimethylsiloxy)silylpropylglycerol(meth)acrylate, trimethylsilylethyltetramethyldisiloxanylpropylglycerol(meth)acrylate, trimethylsilylmethyl(meth)acrylate, trimethylsilylpropyl (meth)acrylate, trimethylsilylpropylglycerol(meth)acrylate, pentamethyldisiloxanylpropylglycerol(meth)acrylate, methyl-bis(trimethylsiloxy)silylethyltetramethyldisiloxanylmethyl(meth)acrylate, tetramethyltriisopropylcyclotetrasiloxanylpropyl(meth)acrylate, and tetramethyltriisopropylcyclotetrasiloxybis(trimethylsiloxy)silylpropyl(meth)acrylate.

Examples of the silicon-containing styrene derivative include trimethylsilylstyrene, and tris(trimethylsiloxy)silylstyrene. On the other hand, examples of the fluorine-containing styrene derivative include o-fluorostyrene, m-fluorostyrene, p-fluorostyrene, trifluorostyrene, perfluorostyrene, p-trifluoromethylstyrene, o-trifluoromethylstyrene, and m-trifluoromethylstyrene.

Moreover, examples of the fluorine-containing alkyl (meth)acrylate include 2,2,2-trifluoroethyl(meth)acrylate, 2,2,3,3-tetrafluoropropyl(meth)acrylate, 2,2,3,3,3-pentafluoropropyl(meth)acrylate, 2,2,2-trifluoro-1-trifluoromethylethyl(meth)acrylate, 2,2,3,3-tetrafluoro-tert-pentyl(meth)acrylate, 2,2,3,3,4,4,4-hexafluorobutyl(meth)acrylate, 2,2,3,3,4,4-hexafluorobutyl(meth)acrylate, 2,2,3,4,4,4-hexafluoro-tert-hexyl(meth)acrylate, 2,2,3,3,4,4,4-heptafluorobutyl(meth)acrylate, 2,2,3,3,4,4,5,5-octafluoropentyl(meth)acrylate, 3,3,4,4,5,5,6,6-octafluorohexyl(meth)acrylate, 2,3,4,5,5,5-hexafluoro-2,4-bis(trifluoromethyl)pentyl(meth)acrylate, 2,2,3,3,4,4,5,5,5-nonafluoropentyl(meth)acrylate, 2,2,3,3,4,4,5,5,6,6,7,7-dodecafluoroheptyl(meth)acrylate, 3,3,4,4,5,5,6,6,7,7,8,8-dodecafluorooctyl(meth)acrylate, 3,3,4,4,5,5,6,6,7,7,8,8,8-tridecafluorooctyl(meth)acrylate, 2,2,3,3,4,4,5,5,6,6,7,7,7-tridecafluoroheptyl(meth)acrylate, 3,3,4,4,5,5,6,6,7,7,8,8,9,9,10,10-hexadecafluorodecyl(meth)acrylate, 3,3,4,4,5,5,6,6,7,7,8,8,9,9,10,10,10-heptadecafluorodecyl(meth)acrylate, 3,3,4,4,5,5,6,6,7,7,8,8,9,9,10,10,11,11-octadecafluoroundecyl(meth)acrylate, 3,3,4,4,5,5,6,6,7,7,8,8,9,9,10,10,11,11,11-nonadecafluoroundecyl(meth)acrylate, 3,3,4,4,5,5,6,6,7,7,8,8,9,9,10,10,11,11,12,12-eicosafluorododecyl(meth)acrylate, 2-hydroxy-4,4,5,5,6,7,7,7-octafluoro-6-trifluoromethylheptyl(meth)acrylate, 2-hydroxy-4,4,5,5,6,6,7,7,8,9,9,9-dodecafluoro-8-trifluoromethylnonyl(meth)acrylate, and 2-hydroxy-4,4,5,5,6,6,7,7,8,8,9,9,10,11,11,11-hexadecafluoro-10-trifluoromethylundecyl(meth)acrylate.

In addition to the above, the silicon-containing macromonomer is a conventionally well-known macromonomer, containing molecules, to which silicon (Si) is bonded. Typical examples of the silicon-containing macromonomer include polysiloxane macromonomer, which has polymeric groups at its both ends, and described in JP-A-2-188717, JP-2-213820, and JP-A-3-43711, and polysiloxane macromonomer, whose polymeric group is bonded to the main chain of siloxane by an urethane bond.

In the present specification, the term "alkyl(meth)acrylate" is generic to "... acrylate" and "... methacrylate". Likewise, terms for the other derivatives of (meth)acrylate are generic to "... acrylate" and "... methacrylate".

The above-mentioned silicon-containing monomer and/or fluorine-containing monomer are/is used as main component of a polymerizable composition, and the desired polymer is formed by polymerizing the monomer. It is generally desirable that the ratio of the silicon-containing monomer, which is included in and bonded to the polymer, is 10 to 90% by weight, preferably 15 to 80% by weight, more preferably 20 to 75% by weight. It is also desirable that the ratio of the fluorine-containing monomer, which is included in and bonded to the polymer, is 5 to 90% by weight, preferably 10 to 80% by weight, more preferably 15 to 75% by weight. If the ratio of the monomers in the polymer is lower than the above, there is a problem that sufficient second-order transition point and oxygen permeation coefficient may not be obtained. On the other hand, if the ratio is higher than the above, physical properties of the contact lens may be deteriorated.

It is advantageous to use the silicon-containing monomer and the fluorine-containing monomer together, and have these monomers bonded to and included in the polymer, in order to further facilitate the achievement of the present invention. In this case, it is generally desirable, to obtain the excellent physical properties of the contact lens, that a total amount of the silicon-containing monomer and the fluorine-containing monomer is 15 to 95% by weight, preferably 20 to 90% by weight, more preferably 25 to 85% by weight.

It is needless to mention that conventionally used various unsaturated monomers may be suitably selected and used, in order to obtain the polymeric material (polymer) to form the photochromatic contact lens of the present invention. For example, there may be used various monomers which contain amide groups, such as alkyl(meth)acrylates, styrene and styrene derivatives, (meth)acrylic acid, 2-hydroxyethyl (meth)acrylate, acrylamide and acrylamide derivatives, N-alkylmethylene pyrrolidone, N-vinyl lactams, etc. These monomers are suitably selected based on characteristics of the desired contact lens.

In the present invention, in order to improve mechanical strength and morphological stability of the configuration of the contact lens, conventionally used various cross-linking agents can be suitably added. It is needless to mention that the kind of the cross-linking agent is not particularly limited. Examples of the cross-linking agent include (meth)acrylates of a polyol, vinylesters and allyl esters of a polybasic carboxylate, divinylbenzene, triallyl cyanurate, triallyl isocyanurate, diethyleneglycolbis(allylcarbonate), triallyl trimellitate, allylether, diallylether of alkyleneglycol or polyalkyleneglycol, divinylether of alkyleneglycol or polyalkyleneglycol, allylvinylether of alkyleneglycol or polyalkyleneglycol, diallylidenepentaerythrite, and 1,3,5-trivinyl-1,3,5-trimethylcyclotrisiloxane, and at least one of these conventionally known cross-linking agents may be suitably selected and used.

As the polymeric material, which comprises the polymer obtained by polymerizing the above-mentioned monomer, there can be used a polymer, which has the second-order transition point of not higher than 110° C., preferably not higher than 100° C., more preferably not higher than 70° C., and has the oxygen permeation coefficient (Dk-value obtained by using an electrode method) of not less than 50, preferably not less than 70, more preferably not less than 100. By using the polymeric material, which satisfies the above ranges of the second-order transition point and the oxygen permeation coefficient, there is effectively realized a reduction of the period of time for the discoloration of the contact lens from the colored state.

As the dye capable of exhibiting photochromism, which is included in the photochromic contact lens, in particular, the polymeric material which forms the photochromic contact lens, there is used a compound, which changes the color as follows: the structure of the dye is changed by a light so that the dye is colored by an irradiation of the light (UV-light), and the color is discolored by an insulation of the light (UV-light). As the above-mentioned compound, there are known, for example, spiropyran compound, spirooxazine compound, thioindigo compound, triallyl methane compound. More particularly, there can be used 1,3-dihydro-1,3,3-trimethylspiro[2H-indole-2,3'-[3H]naphth[2,1-b][1,4]oxazine], 13-dihydro-1,3,3-trimethylspiro[2H-indole-2,3'-[3H]phenantho[9,10-b][1,4]oxazine], 1',3'-dihydro-1',3',3'-trimethyl-6-nitrospiro[2H-1-benzopyran-2,2'-(2H)-indole], 1,3,3,5-tetramethylspiro[indolino-2,3'-naphth[2,1-b][1,4] oxazine], 5-methoxy-1,3,3-trimethylspiro[indolino-2,3'-naphth[2,1-b][1,4]oxazine], 5-chloro-1,3,3-trimethylspiro [indolino-2,3'-naphth[2,1-b][1,4]oxazine], etc. Among these dyes, in the present invention, it is desirable to use spiropyran compound or spirooxazine compound, which does not have a nitro group as a substituent. Owing to this, it is possible to further reduce the time to discolor the contact lens from the colored state.

The ratio of the dye capable of exhibiting photochromism can be suitably increased or decreased, based on the type of the dye or the purpose of its use. However, the dye is generally used within an amount of 0.001 to 5 parts by weight, per 100 parts by weight of the polymeric material.

The method of adding the above-mentioned dye capable of exhibiting photochromism to the contact lens (polymeric material) can be selected from various kinds of conventionally well-known methods. For example, there can be employed a method of introducing the dye to the contact lens, by using a solution of the dye, which is obtained by dissolving the dye in a suitable solution, and causing a swelling of the contact lens (polymeric material). In the present invention, there is preferably employed the method of adding the dye capable of exhibiting photochromism to the contact lens, in which the dye capable of exhibiting photochromism is added to the polymerizable composition to form the contact lens, which comprises any one of, or any combination of the above-mentioned monomers, and then the polymerizable composition is polymerized, so that thus obtained polymeric material contains the dye. Owing to this method, the dye can be uniformly dissolved and dispersed in the polymerizable composition, and accordingly, the dye is uniformly dispersed in thus obtained polymeric material and in the formed contact lens. Therefore, the desired photochromic effect can be advantageously realized.

As the method of polymerizing the polymerizable composition, which comprises any one of, or any combination of the above-mentioned monomers, there may be used, for example, a heat-polymerization, wherein the polymerizable composition is heated gradually or in steps from the room temperature to about 130° C., after the polymerization initiator is added to the polymerizable materials. There may also be used a photopolymerization, wherein the polymerizable materials are polymerized by an irradiation of a suitable light, e.g., UV-ray. The heat-polymerization and the photopolymerization can be used in combination. Among these methods, the heat-polymerization is preferably employed for the present invention. Mass polymerization is preferably used as the method of the polymerization, but the other various known methods can also be employed.

Generally, if the heat-polymerization is employed, a polymerization initiator is used, and if the polymerization is achieved by the irradiation of UV-ray, etc., a sensitizer is used. The polymerizable materials can be polymerized by the irradiation of the light and/or the heat, by using either of, or both of the polymerization initiator and the sensitizer.

Examples of the polymerization initiator include various kinds of conventionally used polymerization initiator, such as azobisisobutyronitrile, azobisdimethylvaleronitrile, t-butylhydroperoxide, and benzoyl peroxide. Examples of the sensitizer include conventionally used sensitizers, such as diethoxyacetophenone, 4-(2-hydroxyethoxy)phenyl-(2-hydroxy-2-propyl)ketone, 2-hydroxy-2-methyl-1phenylpropyl-1-one, 2-methyl-2-morpholino(4-thiomethylphenyl)propyl-1-one, 1-hydroxycyclohexyl-phenylketone, and 2-benzyl-2-dimethylamino-4-morpholinophenyl-butanone benzyldimethylketal.

The forming method (processing method) of the ophthalmic lens is not particularly limited, either. There may be employed a cutting method, wherein the polymerizable composition of monomers is put into a suitable mold or container for polymerization, and polymerized in the mold or the container, and the resultant lens blank (polymer or polymeric material), which is bar-shaped, block-shaped, plate-shaped, etc., is further formed into a desired configuration by a known mechanical processing such as cutting or grinding. Instead of the cutting method, there may also be employed a casting (molding) method, in which a predetermined polymerizable composition is put into a mold cavity, and the polymerizable composition is polymerized in the mold cavity, so as to form the molded product. Any other forming method, which is conventionally well known to a person in the art, such as a combination of the molding and the cutting methods, wherein the finishing work is done by effecting thereon machining operations, may also be employed, if required. Among these methods, the molding method is preferably employed, because the molding method is useful to effectively reduce the production cost.

To the photochromic contact lens of the present invention, which is formed by the above-mentioned methods, conventionally known coloring matter (dye or paint) may be added, in addition to the predetermined dye capable of exhibiting photochromism. If the photochromic contact lens, which includes the additional coloring matter, and the predetermined dye capable of exhibiting photochromism, is irradiated with a light, a mixed color of the color of the photochromic dye and that of the additional coloring matter is obtained. In this case, if the color of the photochromic dye is discolored, the contact lens only has the color of the additional coloring matter, so that the contact lens can be more fashionable.

In the photochromic contact lens of the present invention, the dye capable of exhibiting photochromism is uniformly dispersed in the polymeric material, or the contact lens 10, as shown in FIG. 1a. In other words, there can be preferably employed a configuration, in which the contact lens 10 is made of a single layer 12 which contains the dye. However, the configuration of the contact lens is not limited to the single-layered structure, as long as the dye capable of exhibiting photochromism is included in the predetermined polymeric material. For example, as shown in FIG. 1b, there may be employed a thee-layered structure, wherein the dye capable of exhibiting photochromism is included in dye-containing layer 16, which is located in the center of the thickness (center of the thickness of the vertical direction of FIG. 1b) of the contact lens 14, and the dye-containing layer 16 is located between no-dye-containing layers 18, 18, which do not include the dye. There may also be employed a two-layered structure, as shown in FIG. 1c, which comprises dye-containing layer 22 and no-dye-containing layer 24, and the dye capable of exhibiting photochromism is included only in one of the surfaces of the contact lens 20. Moreover, the dye capable of exhibiting photochromism may be included over the entire area of the contact lens as shown in FIG. 2a, or may be included to form various patterns. For example, as shown in FIG. 2b, the dye capable of exhibiting photochromism may be included to form a polka-dot pattern or a leopard pattern. The dye capable of exhibiting photochromism may also be included to form a circle which is smaller than and concentric to the contact lens, as shown in FIG. 2c.

EXAMPLES

To further clarify the concept of the present invention, some examples of the invention will be described. It is to be understood that the invention is not limited to the details of the illustrated examples and the foregoing description, but may be embodied with various changes, modifications and improvements, which may occur to those skilled in the art without departing from the scope of the invention defined in the attached claims. Parts and percentages used in the EXAMPLES are calculated by weight, if not otherwise specified.

Example 1

There were obtained methyl methacrylate (MMA), and tris(trimethylsiloxy)silylpropyl methacrylate (SK-5001), as the monomers, which provide the polymeric material to form the contact lens. There was also obtained ethyleneglycol dimethacrylate (EDMA) as the cross-linking agent, while azobisisobutyronitrile (AIBN) was obtained as the polymerization initiator. Further, there was obtained 1,3-dihydro-1,3,3-trimethylspiro[2H-indole-2,3'-[3H]naphth[2,1-b][1,4]oxazine] (Photo-1), as the photochromic dye.

Each of SK-5001, MMA, EDMA, AIBN and Photo-1 was put into predetermined containers (test tubes) for the polymerization after each component was weighed on the scale, so that each component in the mixture had the respective ratio as described in the TABLE 1 below. Subsequently, the test tubes, which contain the respective polymerizable components, were heated in a constant temperature bath at 35° C. for 40 hours. Then the temperature was increased to 50° C. and kept at 50° C. for eight hours. In this way, the polymerizable components were polymerized, and stick-shaped polymers (ophthalmic lens blanks) were obtained.

The second-order transition points of each of the obtained ophthalmic lens blanks were measured, while a portion of each of the lens blanks was processed, on a lathe, into a desired contact lens. Oxygen permeation coefficients (Dk-value) of each of the lens blanks were measured by using the electrode method. There were observed development of color by the irradiation of an UV lamp (black light) and the state of the discoloration (time needed for the discoloration) after the removal of the UV lamp. Dk-value used here was the value obtained by using the value, which was calculated by the electrode method: $(Dk) \times 10^{-11}$ $(cm^2/sec)$ $[mLO_2/mL \times mmHg]$.

TABLE 1

| | | \multicolumn{6}{c}{Samples} | | | | | |
|---|---|---|---|---|---|---|---|
| | | No. 1 | No. 2 | No. 3 | No. 4 | No. 5 | No. 6 |
| Composition (parts by weight) | SK5001 | 0 | 20 | 40 | 60 | 80 | 100 |
| | MMA | 100 | 80 | 60 | 40 | 20 | 0 |
| | EDMA | 5 | 5 | 5 | 5 | 5 | 5 |
| | AIBN | 0.05 | 0.05 | 0.05 | 0.05 | 0.05 | 0.05 |
| | Photo-1 | 0.03 | 0.03 | 0.03 | 0.03 | 0.03 | 0.03 |
| Characteristics | Tg (° C.) | 132.3 | 121.1 | 113.8 | 68.5 | 56.8 | 18.2 |
| | Dk | 0 | 20 | 40 | 75 | 158 | 250 |
| | Time when the coloration begins | Just after the irradiation | Just after the irradiation | Just after the irradiation | Just after the irradiation | Just after the irradiation | Just after the irradiation |
| | Time needed for the discoloration (seconds) | 280 | 180 | 120 | 55 | 40 | 10 |

Example 2

The contact lenses were formed by the polymer, which was polymerized by a method similar to that of the above EXAMPLE 1, except that 1',3'-dihydro-1',3',3'-trimethyl-6-nitrospiro[2H-1-benzopyran-2,2'-(2H)-indole] (Photo-2) was used as the photochromic dye. There were evaluated the second-order transition (Tg), oxygen permeation coefficient (Dk), the time when the coloration begins, and the time needed for the discoloration, similar to the above EXAMPLE 1, and the results were shown in the TABLE 2 below.

TABLE 2

| | | \multicolumn{6}{c}{Samples} | | | | | |
|---|---|---|---|---|---|---|---|
| | | No. 7 | No. 8 | No. 9 | No. 10 | No. 11 | No. 12 |
| Composition (parts by weight) | SK5001 | 0 | 20 | 40 | 60 | 80 | 100 |
| | MMA | 100 | 80 | 60 | 40 | 20 | 0 |
| | EDMA | 5 | 5 | 5 | 5 | 5 | 5 |
| | AIBN | 0.05 | 0.05 | 0.05 | 0.05 | 0.05 | 0.05 |
| | Photo-2 | 0.03 | 0.03 | 0.03 | 0.03 | 0.03 | 0.03 |
| Characteristics | Tg (° C.) | 132.3 | 121.1 | 113.8 | 68.5 | 56.8 | 18.2 |
| | Dk | 0 | 20 | 40 | 75 | 158 | 250 |
| | Time when the coloration begins | Just after the irradiation | Just after the irradiation | Just after the irradiation | Just after the irradiation | Just after the irradiation | Just after the irradiation |
| | Time needed for the discoloration (seconds) | 1300 | 1200 | 1100 | 1000 | 800 | 500 |

Example 3

There were obtained tris(trimethylsiloxy)silylpropyl acrylate (SK-5021), silicon urethane macromer (MAUS), which was synthesized by a method similar to the method of Example 1 of JP-A-2001-72739, and SK-5001, as the silicon-containing monomer. There was also obtained 2,2,2-trifluoroethyl methacrylate (3FEA) as the fluorine-containing monomer. Moreover, there were obtained N,N-dimethylacrylamide (DMAA), vinyl acetate (Vac), hydroxyethyl methacrylate (HEMA), as the hydrophilic components. Further, allyl methacrylate (AMA) and EDMA were obtained as the cross-linking agent, while 2-hydroxy-2-methyl-1-phenylpropane-1-one (Darocure 1173) and AIBN were obtained as the initiator.

Each of thus obtained components were mixed in accordance with the ratio as shown in the TABLE 3 below, and the polymerizable compositions were obtained and numbered as Nos. 13 to 15. The sample Nos. 13 and 14 were subjected to the above-mentioned photopolymerization, while the sample No. 15 was subjected to the above-mentioned heat-polymerization. After the desired polymers were obtained, contact lenses were produced by a conventionally used cuffing method.

Subsequently, the photochromic dye: Photo-1, which was used in the above EXAMPLE 1, was impregnated to each of the three different types of contact lenses. In detail, the photochromic dye: Photo-1 was dissolved in ethanol, and the contact lenses made from sample Nos. 13 and 15 (contact lens Nos. 13 and 15) were immersed in thus obtained solution and expanded. Then the contact lenses Nos. 13 and 15 were immersed in distilled water, so that the solution was replaced with the distilled water. In this way, the photochromic dye: Photo-1 was introduced into the contact lenses. The contact lens made from the sample No. 14 (contact lens No. 14) was also immersed and expanded in the solution, in which Photo-1 was dissolved in ethanol, but the contact lens No. 14 was then taken out of the solution and dried in the air. Further, the surface of the contact lens No. 14 was washed with distilled water, and kept in distilled water or a physiological salt solution.

Similar to the above EXAMPLE 1, there were evaluated the time when the coloration begins, and the time needed for the discoloration of thus formed contact lenses into which the photochromic dye: Photo-1 was introduced, and the results were shown in the TABLE 3 below, together with the measurement results of the second-order transition (Tg) and the oxygen permeation coefficient (Dk).

TABLE 3

| | | Samples | | |
|---|---|---|---|---|
| | | No. 13 | No. 14 | No. 15 |
| Composition (parts by weight) | SK5001 | 25 | — | — |
| | SK5002 | — | 22 | — |
| | MAUS | 25 | 30 | — |
| | 3FEA | — | 20 | — |
| | DMMA | 50 | — | — |
| | Vac | — | 28 | — |
| | HEMA | — | — | 100 |
| | EDMA | 0.3 | 0.4 | 0.2 |
| | AMA | — | 0.4 | — |
| | Darocure 1173 | 0.4 | 1.2 | — |
| | AIBN | — | — | 0.04 |
| Characteristics | Tg (° C.) | 52.1 | 31.0 | 105.7 |
| | Dk | 105 | 130 | 9 |
| | Time when the coloration begins | Just after the irradiation | Just after the irradiation | Just after the irradiation |
| | Time needed for the discoloration (seconds) | 10 | 15 | 300 |

As it is apparent from comparison of the results in the above TABLE 1, TABLE 2, and TABLE 3, all of the contact lenses were colored just after the irradiation of the light, owing to the photochromic dye added to the contact lenses, so that desired colored contact lenses were obtained. In addition to this, the color was more immediately developed by using a polymer (polymeric material) which had a low second-order transition (Tg), as the contact lens material, and if the value of the oxygen permeation coefficient (Dk-value) of the contact lens material was higher, the development of the color became faster. Owing to the low second-order transition (Tg) and the high oxygen permeation coefficient (Dk-value), the period of time needed for the discoloration was also effectively reduced, so that the discoloration can be realized in much shorter period of time. These features are more effectively realized by copolymerizing the silicon-containing monomer and/or the fluorine-containing monomer. In addition to this, by copolymerizing the silicon-containing monomer, the period of time needed for the discoloration can be significantly reduced. In terms of the use of the photochromic dye, it is understood that the use of Photo-1, which does not contain nitro group, can reduce much more time than the use of Photo-2, which contains nitro group.

INDUSTRIAL APPLICABILITY

As is apparent from the foregoing description, the photochromic contact lens according to the present invention has excellent characteristics that the contact lens is rapidly colored under a strong light, so that the contact lens protects the eye of the user, and exhibits a characteristic of anti-dazzling effect, while the color is rapidly discolored in a very short period of time, if the light is weakened or insulated. Owing to these characteristics, the adaptability of the contact lens, when it is used in a tunnel, for instance, can be advantageously improved.

What is claimed is:

1. A photochromic contact lens having excellent discoloring characteristic, comprising:
   a photochromic contact lens comprising an oxygen-permeable polymeric material and a dye capable of exhibiting photochromism, said oxygen-permeable polymeric material having a second-order transition point of not higher than 110° C., said photochromic contact lens being formed to have an oxygen permeation coefficient of not less than 50, said polymeric material being a polymer obtained by polymerizing a polymerizable composition, said polymerizable composition comprising a silicon-containing monomer which is polymerized in the polymer, and a ratio of the silicon-containing monomer in the polymer being 10-90% by weight.

2. A photochromic contact lens according to claim 1, wherein said dye capable of exhibiting photochromism comprises at least one compound selected from the group consisting of spiropyran compounds which do not contain any nitro group substituent and spirooxazine compounds which do not contain any nitro group substituent.

3. A photochromic contact lens according to claim 2, wherein said spirooxazine compound comprises 1,3-dihydro-1,3,3-trimethyl spiro[2H-indole-2,3'-[3H]naphth[2,1-b][1,4]oxazine].

4. A photochromic contact lens according to claim 1, wherein an amount of the dye capable of exhibiting photochromism is 0.001-5 parts by weight, per 100 parts by weight of the polymeric material.

5. A photochromic contact lens according to claim 1, wherein a ratio of the fluorine-containing monomer in the polymer is 5-90% by weight.

6. A photochromic contact lens according to claim 1, wherein a ratio of a total amount of the silicon-containing monomer and the fluorine-containing monomer in the polymer is 15-95% by weight.

7. A photochromic contact lens according to claim 1, wherein said fluorine-containing monomer comprises at least one monomer selected from the group consisting of fluorine-containing styrene derivatives and fluorine-containing alkyl (meth)acrylate compounds.

8. A photochromic contact lens according to claim 1, wherein said polymeric material is a polymer obtained by polymerizing a polymerizable composition, comprising:
   a silicon-containing monomer andlor a fluorine-containing monomer;
   an additional unsaturated monomer, which contains none of said silicon-containing monomer and none of said fluorine-containing monomer; and
   a cross-linking agent which includes at least two polymerizable groups.

9. A photochromic contact lens according to claim 1, wherein said dye capable of exhibiting photochromism is included in the polymeric material, by an addition of the dye capable of exhibiting photochromism to the polymerizable composition.

10. A photochromic contact lens according to claim 1, wherein said oxygen permeation coefficient is not less than 70.

11. A photochromic contact lens according to claim 1, wherein said second-order transition point is not higher than 100° C.

12. A photochromic contact lens as recited in claim 1, wherein said polymerizable composition comprises at least one monomer selected from the group consisting of methyl (meth)acrylate, dimethylacrylamide and tris(trimethylsiloxy)silylpropyl (meth)acrylate.

13. A photochromic contact lens according to claim 1, wherein said silicon-containing monomer comprises at least one monomer selected from the group consisting of a silicon-containing (meth)acrylate, a silicon-containing styrene derivative, and a silicon-containing macromonomer.

14. A photochromic contact lens as recited in claim 1, wherein said polymerizable composition further comprises a fluorine-containing monomer.

15. A photochromic contact lens having excellent discoloring characteristic, comprising:

a photochromic contact lens comprising an oxygen-permeable polymeric material and a dye capable of exhibiting photochromism, said oxygen-permeable polymeric material having a second-order transition point of not higher than 110° C., said photochromic contact lens being formed to have an oxygen permeation coefficient of not less than 50, said polymeric material being a polymer obtained by polymerizing a polymerizable composition, said pplymerizable composition comprising a silicon-containing monomer which comprises at least one monomer selected from the group consisting of a silicon-containing (meth)acrylate, a silicon-containing styrene derivative, and a silicon-containing macromonomer.

16. A photochromic contact lens as recited in claim 15, wherein said polymerizable composition further comprises a fluorine-containing monomer.

* * * * *